UNITED STATES PATENT OFFICE.

RENÉ BOHN, OF MANNHEIM, GERMANY, ASSIGNOR TO BADISCHE ANILIN & SODA FABRIK, OF LUDWIGSHAFEN, GERMANY.

BLUE DYE AND PROCESS OF MAKING SAME.

SPECIFICATION forming part of Letters Patent No. 682,528, dated September 10, 1901.

Application filed February 25, 1901. Serial No. 48,792. (No specimens.)

*To all whom it may concern:*

Be it known that I, RENÉ BOHN, doctor of philosophy and chemist, a citizen of the Swiss Republic, residing at Mannheim, in the Grand Duchy of Baden, Germany, have invented new and useful Improvements in Blue Dyes and Processes of Making Same, of which the following is a specification.

I have discovered that by melting beta-amido-anthraquinone with caustic potash at a temperature of one hundred and eighty (180) to three hundred (300) degrees centigrade a leuco substance of a new dyestuff is formed. On treating the melt thus obtained with water and blowing in air this leuco substance is oxidized and a blue crystalline substance separates out in the insoluble form, which is the new coloring-matter I wish to claim. The same coloring-matter can be obtained when in place of beta-amido-anthraquinone its sulfo-acid or hydrogenized derivatives of these substances are melted with caustic potash.

My new coloring-matter is insoluble in caustic-soda or sodium-carbonate solution or dilute hydrochloric-acid solution. It is soluble in nitrobenzene and difficultly soluble in anilin and chloroform, the solutions being blue-green, while it is almost insoluble in benzene and acetin. In concentrated sulfuric acid (containing ninety-six per cent. of $H_2SO_4$) it dissolves with a yellow-brown color, and in fuming sulfuric acid (containing twenty-three per cent. of $SO_3$) with a dirty-brown color. My new coloring-matter is, however, soluble in caustic-soda solution in the form of its leuco compound, which may be obtained by treating the coloring-matter with a suitable alkaline reducing agent—for example, sodium hydrosulfite in the presence of caustic soda—and in this form it exhibits the typical properties of a vat, dyeing textile fiber, especially cotton, blue shades of great brilliancy and excellent fastness. By oxidizing my new coloring-matter with, say, chromic acid it can be converted into a yellow substance, which on suitable reduction with sodium hydrosulfite in alkaline solution is reconverted into my blue coloring-matter.

My new coloring-matter crystallizes from nitrobenzene in blue bronzy needles, which are similar to indigo in appearance and sublime without melting.

The following examples will serve to illustrate the nature of my invention and the manner in which the same may be carried into practical effect; but the invention is not confined to the examples. The parts are by weight.

*Example 1—Production of blue dye.*—Heat together ten (10) parts of beta-amido-anthraquinone and five hundred (500) parts of solid caustic potash for half an hour, while stirring well, to a temperature of two hundred and fifty (250) degrees centigrade. When cold, pour the melt into water and boil up in the presence of air. My new coloring-matter separates out. Filter it off and wash thoroughly with water. It can be directly employed for dyeing after having formed a vat therefrom by suitable reduction, as explained in the following example.

*Example 2—Conversion of blue dye into its soluble form.*—Suspend one (1) part of my new coloring-matter in the form of a paste in five hundred (500) to one thousand (1,000) parts of water at a temperature of fifty (50) to sixty (60) degrees centigrade. Add twenty (20) to thirty (30) parts by volume of a sodium-hydrosulfite solution (containing about ten per cent. of sodium hydrosulfite) and ten (10) to fifteen (15) parts of caustic soda-lye, (containing about twenty-four per cent. of NaOH.) In about half an hour the coloring-matter will have dissolved and the solution directly dyes cotton exceedingly fast blue shades.

Now what I claim is—

1. The process of producing a new blue dye by melting a hereinbefore-defined beta-amido-anthraquinone substance with caustic potash and dissolving the melt in water in the presence of air, substantially as described.

2. The process of producing a new blue dye by melting a hereinbefore-defined beta-amido-anthraquinone substance with caustic potash substantially as described.

3. The new blue dye which can be obtained by melting beta-amido-anthraquinone with caustic potash and dissolving the melt in water in the presence of air which in its unreduced form is a blue substance insoluble in water and caustic-soda solution, whose solution in concentrated sulfuric acid is yellow-brown, which can be converted by oxidation with chromic acid into a yellow substance which substance is reconverted into the original blue coloring-matter on suitable reduction, and which in its reduced form is soluble in caustic-soda solution, which solution dyes textile fiber, especially cotton, directly blue shades, substantially as described.

In testimony whereof I have hereunto set my hand in the presence of two subscribing witnesses.

RENÉ BOHN.

Witnesses:
ROBERT HOLDMANN,
JOHN L. HEINKE.